(No Model.)

T. A. EDISON.
DYNAMO OR MAGNETO ELECTRIC MACHINE.

No. 264,646. Patented Sept. 19, 1882.

WITNESSES:
O. D. Mott
J. Ellis Clark.

INVENTOR:
T. A. Edison
BY Dyer & Wilber
ATTORNEYS.

UNITED STATES PATENT OFFICE.

THOMAS A. EDISON, OF MENLO PARK, NEW JERSEY, ASSIGNOR TO THE EDISON ELECTRIC LIGHT COMPANY, OF NEW YORK, N. Y.

DYNAMO OR MAGNETO ELECTRIC MACHINE.

SPECIFICATION forming part of Letters Patent No. 264,646, dated September 19, 1882.

Application filed November 28, 1881. Renewed August 14, 1882. (No model.)

*To all whom it may concern:*

Be it known that I, THOMAS A. EDISON, of Menlo Park, in the county of Middlesex and State of New Jersey, have invented a new and useful Improvement in Dynamo or Magneto Electric Machines, (Case No. 362;) and I do hereby declare that the following is a full and exact description of the same, reference being had to the accompanying drawings, and to the letters of reference marked thereon.

The object I have in view is to produce another form of dynamo or magneto electric machine or electric engine having disks of copper for the inductive or conducting portion of the armature.

In carrying out my invention a series of copper disks insulated from each other are secured to one side of a cast-iron plate or disk which forms the magnetic portion or core of the armature. The copper disks and iron plate revolve together in chambers in the opposite polar extensions of an exciting-magnet, such polar extensions being beveled on their approaching sides, so that intense magnetic fields will be formed between the polar extensions and opposite portions of the iron plate, and but little force will be expended directly across between the poles of the magnet. The currents generated in each disk in the opposite fields of force flow in the same direction, and the disks being all on one side of the iron plate their currents all flow the same way. To connect up such disks so as to produce a continuous current having a tension due to all the disks, exterior copper rings are used which couple the disks in series. The disks are connected with the bars of the commutator-cylinder by rods or plates passing to projections in central openings of the disks, or to the exterior ring-connections.

Figure 1:
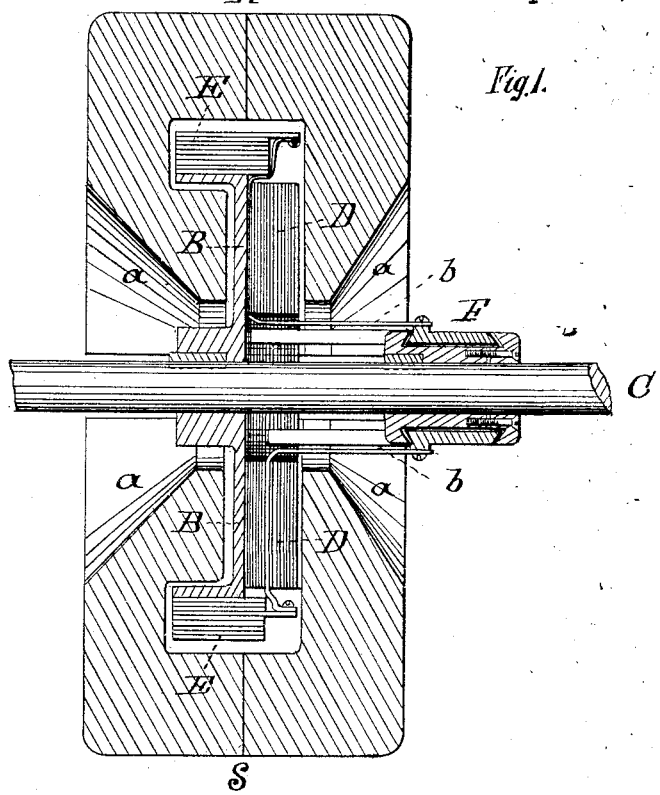
Figure 2:
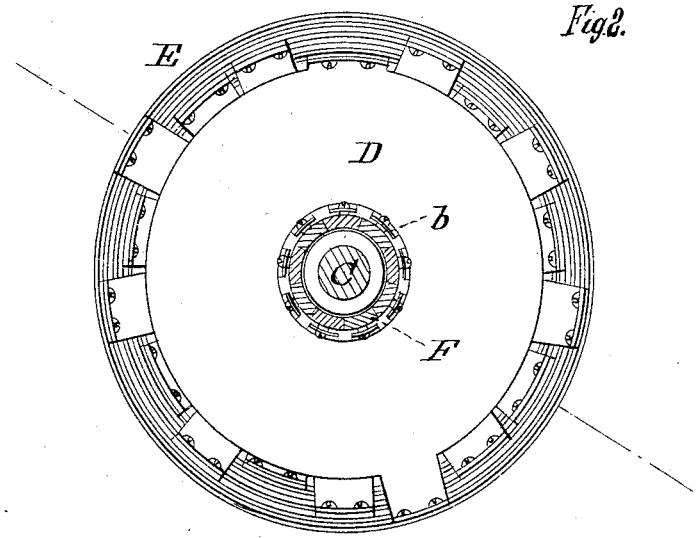

The foregoing will be better understood from the drawings, in which Figure 1 is a vertical section through the armature and the polar extensions of the exciting-magnet; Fig. 2, a separate elevation of the armature from the commutator end, the commutator-cylinder being in vertical section.

N S are the polar extensions of the exciting-magnet, chambered or hollowed out, as shown, to inclose opposite portions of the armature, and having beveled sides *a*, so as to reduce the width of its approaching faces and reduce the attractive force acting directly across between the polar extensions. The armature has a cast-iron plate or disk, B, mounted upon a shaft, C. Secured to one side of this iron plate by bolts or otherwise are a number of copper disks, D, which are insulated from each other and from the iron plate, preferably by means of paper disks. A number of copper rings or segments of rings, E, are supported by the rim of plate B and connect the copper disks in a continuous series. The disks are connected with the bars of commutator-cylinder F by strips or rods *b* extending from the open centers of the disks to such commutator-bars.

What I claim is—

1. A dynamo or magneto electric machine having inductive disks located on one side only of a plate of magnetic metal, substantially as set forth.

2. The armature having inductive disks, in combination with exterior rings for connecting such disks in series, substantially as set forth.

3. The combination, with the exciting-magnet having chambered polar extensions, of the revolving armature having a plate of magnetic metal, inductive disks on one side thereof, rings for connecting the disks in series, and commutator-connections, substantially as set forth.

This specification signed and witnessed this 25th day of October, 1881.

THOS. A. EDISON.

Witnesses:
RICHD. N. DYER,
H. W. SEELY.